United States Patent
Yasuda et al.

(10) Patent No.: US 9,422,202 B2
(45) Date of Patent: Aug. 23, 2016

(54) MOLTEN PHOSPHORUS-POTASSIUM FERTILIZER, AND ITS PREPARATION PROCESS

(75) Inventors: Minoru Yasuda, Poços de Caldas (BR); Gabriel Warwick Kerr de Paiva Cortes, Poços de Caldas (BR)

(73) Assignee: Mineracao Curimbaba Ltda., Pocos de Caldas (BR)

( * ) Notice: Subject to any disclaimer, the term of this patent is extended or adjusted under 35 U.S.C. 154(b) by 0 days.

(21) Appl. No.: 14/355,993

(22) PCT Filed: Sep. 12, 2012

(86) PCT No.: PCT/BR2012/000346
§ 371 (c)(1),
(2), (4) Date: Jul. 31, 2014

(87) PCT Pub. No.: WO2013/063667
PCT Pub. Date: May 10, 2013

(65) Prior Publication Data
US 2014/0345346 A1    Nov. 27, 2014

(30) Foreign Application Priority Data
Nov. 4, 2011    (BR) ..................................... 1106717

(51) Int. Cl.
| | | |
|---|---|---|
| *C05D 1/00* | (2006.01) | |
| *C05D 9/00* | (2006.01) | |
| *C05B 17/00* | (2006.01) | |
| *C05B 13/00* | (2006.01) | |
| *C05B 13/02* | (2006.01) | |
| *C05B 7/00* | (2006.01) | |

(52) U.S. Cl.
CPC . *C05B 17/00* (2013.01); *C05B 7/00* (2013.01); *C05B 13/00* (2013.01); *C05B 13/02* (2013.01); *C05D 1/00* (2013.01); *C05D 9/00* (2013.01)

(58) Field of Classification Search
None
See application file for complete search history.

(56) References Cited

U.S. PATENT DOCUMENTS

| | | | |
|---|---|---|---|
| 1,377,554 A | 5/1921 | Bloom | |
| 2,070,697 A | 2/1937 | Trömel | |
| 3,298,822 A | 1/1967 | Arvay et al. | |
| 3,446,612 A * | 5/1969 | Taylor | 71/40 |
| 3,770,410 A | 11/1973 | Mills et al. | |
| 3,930,833 A | 1/1976 | Roberts | |
| 4,248,617 A | 2/1981 | Kamo et al. | |
| 2012/0060575 A1* | 3/2012 | Miranda et al. | 71/61 |

FOREIGN PATENT DOCUMENTS

WO    WO 01/49635    *    7/2001

OTHER PUBLICATIONS

Seliverstov, V.I. et al., "Method Fire Extinguish Compound Embody," Database WPI, Thomson Scientific, 1999, London, GB, Abstract.

* cited by examiner

*Primary Examiner* — Wayne Langel
(74) *Attorney, Agent, or Firm* — Alston & Bird LLP

(57) ABSTRACT

The present invention relates to an amorphous, vitreous phosphorus-potassium fertilizer obtained by melting raw materials containing phosphorus pentoxide ($P_2O_5$), potassium oxide ($K_2O$), providers of $S_iO_2$ and silicates, and providers of MgO and CaO. The fertilizer of the present invention is produced by a process of melting the raw materials, followed by quenching, enabling the formation of a vitreous and amorphous material containing phases of phosphorus and of potassium, which are soluble in a weak acid.

6 Claims, No Drawings

MOLTEN PHOSPHORUS-POTASSIUM FERTILIZER, AND ITS PREPARATION PROCESS

FIELD OF THE INVENTION

The present invention relates to the production and use of a phosphorus-potassium fertilizer that is soluble in weak acids, this fertilizer being produced by a process of melting the raw materials, followed by quick cooling to enable the formation of a vitreous and amorphous material containing phosphorus and potassium phases that are soluble in weak acids.

BACKGROUND OF THE INVENTION

The importance of phosphorus and potassium as fertilizers is widely known, and for this reason such compounds are widely use. However, so far it is not known any formulation containing, in a single product, the important combination of these two elements, both soluble in a weak acid like citric acid, and an important balance of other components like silica, quicklime, magnesia and micronutrients as complementary elements.

There are various papers dealing with attempts to obtain potassium from alkaline rocks by calcinations or by melting, and none of them uses or mentions the presence of phosphorus in the final fertilizer.

Brazil is an agronomical strong country, and for the success of productivity of the agricultural activities, a large amount of chemical fertilizers based on nitrogen, phosphorus and potassium (NPK) is usually employed in order to meet the demand from the plants and grass cultivated. Traditionally, the component that provides the required amount of potassium in NPK fertilizers is potassium chloride (KCl), whereas the components used for phosphorus are superphosphates, triple phosphates, and others, besides molten Yoorin thermophosphate, a phosphate of calcium and magnesium that is soluble in citric acid.

However, the use of potassium chloride salt has a number of drawbacks, among which the following are cited:

a) after application of the manure, if it rains much and if the rain is heavy, the potassium chloride will be rapidly solubilized and washed away down the declivities of the ground, probably into rivers, thus losing the function of fertilizing and carrying soluble salts into rivers and springs;

b) if, on the other hand, it does not rain after application of the manure, the potassium chloride may kill the plant that was to be fertilized by it, through a phenomenon called "saline effect";

c) also, the chlorine ion present in potassium chloride, imparts taste to the leaves and fruits grown in the soil where this type of fertilizer has been used. The taste of coffee (fine cup) and tobacco is highly damaged, for which reason potassium chloride is replaced in these crops by potassium sulfate and/or potassium sulfate and magnesium, which are much rarer;

d) today, Brazil imports more than 90% of all potassium chloride used in agriculture, this percentage having the tendency to increase due to the increase in productivity of the cultivation of sugar cane and soybeans, and the rising need to meet the growing demand of food, which, as a result, represents the use of larger amounts of fertilizers.

In recent years, scholars have discussed the importance of manures from natural origin when made available in the soil, and at the same time they point out the harms caused by using chemical fertilizers indiscriminately. These studies also show relatively new facts, such as the verification of the importance of the presence of amorphous silica and of micronutrients available in the soil, which are released gradually in the presence of microorganism that exist naturally in the soil or are intentionally added, without the harms of chemical fertilizers. Some of these studies are pointed out hereinafter in order to illustrate the subject in discussion.

Trygon Agricultural Solutions mentions the wisdom and experience acquired by numberless farmers involved in different cultivations in the sense that, even using the best agricultural techniques, saw their productivities gradually decreasing, while the request for fertilizers increased. Modern agriculture has ignored the presence of silicon in the soils. Approximately each ton of soil contains about 277 kg of silicon, that is, any type of plant that grows in the soil is in contact with the huge amounts of silicon compounds, and even so the experts in agriculture do not regard silicon as being an essential element. Modern agriculture considers silicon not to be essential since about the mid-1800's, when artificial silicon was introduced. In 1980, one considered carbon, hydrogen, oxygen, nitrogen, phosphorus, sulfur, potassium, calcium, magnesium and iron to be essential nutrients. Between 1922 and 1954, manganese, copper, zinc, molybdenum, boron and chlorine were added thereto, thus totalizing 16 essential elements required for the growth of the plant. Many years passed until the last-named essential element, namely boron, was also considered. Plant physiologists are actively engaged in determining which other elements could be added to the list of the sixteen elements mentioned above and that are considered essential for the plants. In 1964, nickel, for example, was suggested as a candidate. Today, there are over 20 elements that are considered to be beneficial to the plants, but silicon continues to be included in this list.

It was found that silicon promotes absorption of other nutrients such as nitrogen, phosphorus, potassium, calcium, magnesium and zinc, among others. Several studies have demonstrated that silicon has significant influence on the accumulative growth of plants such as sugar cane, barley, wheat and rye. The cultivation of soybeans shows a marked decrease ion the growth in the absence of silicon. High concentrations of silicon at the borders of the plant tissues increase their resistance to attack by fungi and other organisms, and silicon also raises the resistance of the plant to saline effects, besides reducing the effect of toxicity caused by elements like aluminum, iron, manganese and other heavy metals.

In order for silicon to be made available for the plant, it has to be in the amorphous state or has to be present as a result of the chemical action exerted by organic matter, microbes, acids and enzymes encountered in the soil, as well as clays, which transform silica present in fine fractions into silicic acid, which can be absorbed by the plant. The transformation reaction is as follows:

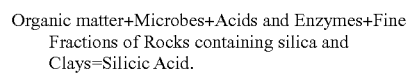

Organic matter+Microbes+Acids and Enzymes+Fine Fractions of Rocks containing silica and Clays=Silicic Acid.

M. J. Hodwon and A. F. Sangster, Silicon and Abiotic Stress, Oxford Brookes University, UK, Glendon College, York University, Canada, have found that there is considerable evidence that silicon is beneficial to plant growth, being added, today, as a fertilizer. Reductions in growth and in productivity have been frequently reported when silicon is supplied in smaller amounts than those considered optimum for determined plant culture. The deficiency of silicon in the soil may also entail quite complex effects on other nutrients. For instance, the improvement in the growth of cucumbers by the action of silicon depends on the unbalance in the supply of phosphorus and zinc. There is also a considerable number of works published regarding the effects of silicon on mineral toxicity. Silicon may have a beneficial effect on plant growth in saline conditions, it seems that silicon restricts the absorption of sodium for sensitive plant growth and that this mechanism blocks the perspiration passage flow. Studies made by W. J. Host and H. Mrchner, from Germany, show clearly the importance of silicon in blocking the toxicity caused by manganese. Various other studies have demonstrated the importance of silicon in preventing the toxicity caused by heavy metals. The toxicity caused by aluminum is also reduced or eliminated by the presence of silicon.

Patent application PI 080373-2 describes a process for preparing a potassium fertilizer, that is vitreous, totally soluble and exhibits high fertilization power due to the high solubility of potassium, as well as of other nutrients in the soil. The process for producing fertilizer described in that document comprises the steps of (a) preparing a mixture containing from 40 to 80% by weight of powdered alkaline rocks and from 20 to 60% by weight of powdered calcareous rocks, (b) melting the thus obtained mixture, (c) quenching the molten material and (d) grinding the resulting material.

Superphosphates and triple phosphates are also used as fertilizers, but their use contributes to excessive acidification of the soil, requiring growing amounts of ground calcareous rocks used in an additional operation called liming. The neutralization power of superphosphates and triple phosphates is zero. In the case of Yoorin thermophosphate, this phenomenon does not occur because it is derived from melting and has a neutralization power higher than 60% as compared with calcareous rocks (=100%).

Therefore, it is an objective of the present invention to provide a fertilizer that enables improved release of both phosphorus and potassium, in addition to the benefits of the presence of amorphous silica available and micronutrients, while exhibiting a nature of acidic neutralization of the soil.

Abreu, C. A., from the Instituto Agronômico de Campinas, in October 2006, studied the bleaching of potassium applied to the soil in the form of potassium chloride and of molten potassium thermophosphate, and concluded that the molten potassium thermophosphate provided lower losses of potassium in the soil, higher availability of this element and higher concentration of calcium, magnesium and phosphorus.

As a result, it is another objective of the present invention to make alternative fertilizers available in an economical manner, which enable improved release of phosphorus and potassium in the soil.

SUMMARY OF THE INVENTION

The present invention relates to amorphous, vitreous phosphoro-potassium fertilizer obtained by melting raw materials containing phosphorus pentoxide ($P_2O_5$), potassium oxide ($K_2O$), providers of $SiO_2$ and silicates, and providers of MgO and CaO.

The invention further relates to a process for preparing the above-described phosphorus-potassium fertilizer comprising a step of melting a mixture of said raw materials, followed by a quenching step.

DETAILED DESCRIPTION OF THE INVENTION

The present invention relates to a phosphorus-potassium fertilizer obtained by melting raw materials containing phosphorus pentoxide ($P_2O_5$), preferably contained in phosphorus minerals such as apatite and phosphorite, potassium oxide ($K_2O$), preferably contained in potassium minerals such as potassium rocks and phonolite. In addition, the fertilizer of the present invention also contains materials that provides $SiO_2$. In a preferred embodiment, the fertilizer of the present invention optionally further comprises, as raw material for obtaining it, components like sands, materials providing $SiO_2$ and silicates; dunites or serpentinites, providers of $SiO_2$ and MgO; manganese, providers of MgO; dolomites, providers of CaO and MgO.

In the phosphorus-potassium fertilizer of the present invention, almost all the $P_2O_5$ together with the $K_2O$ and $SiO_2$ contained in the fertilizer are soluble in a weak acid such as citric acid, and not soluble in water, so the fertilizer corrects the acidity of the soil, especially when CaO, MgO and $K_2O$ are available, and can prevent the need for liming, being also a provider of amorphous vitreous $SiO_2$ soluble in citric acid and not soluble in water, thus meeting the needs of the plants.

The raw materials used for supplying the various components for the preparation of the fertilizer of the present invention may be selected, for instance, from mixtures of alkaline rocks from the Planalto de Pocos de Calda and natural phosphate rocks of different origins, which are later molten and quenched in water, being transformed into a vitreous and amorphous material, with phases of potassium, phosphorus and silicon that are soluble in weak acids.

However, alkaline rocks from the Planalto de Poços de Caldas and phosphate rocks are cited herein as preferred embodiments, but they do not restrict the invention, since other sources of potassium and phosphorus than those mentioned herein may be used for the same purpose, being natural or synthetic, without detriment to the quality desired for obtaining potassium and phosphorus pentoxide soluble in weak acids and not soluble in water.

Preferably, the starting raw materials used also comprise silica, quicklime, magnesia and micronutrients that play an advantageous role in obtaining the potassium-phosphorus fertilizer described herein and their addition to the process, even when it comes from sources that do not restrict the invention.

The ratios of components $P_2O_5$, $K_2O$, $SiO_2$, CaO, MgO, as well as that of micronutrients, when they are present, may vary without altering the desired characteristics of the amorphous vitreous final fertilizer. Therefore, such ratios are not limitative of the scope of the present invention.

The process for preparing the phosphorus-potassium fertilizer of the present invention comprises a step of melting said raw materials, followed by a quenching step. The raw materials selected are homogenized and molten in a continuous process and concomitantly cast in water for quenching, so as to prevent recrystallization, solidification to small, vitreous and amorphous particles, which, after draining the water, are dried and ground, preferably to a particle size of 100 mesh, in order to obtain the phosphorus-potassium fertilizer.

The step of melting the mixture of raw materials may be carried out with any equipment that meets the condition for melting as described above. The important thing is that the melting should be carried at temperatures high enough to achieve said melting and keeping it in a sufficiently liquid state to be poured. For this purpose, it can be used, for instance, electric-arc furnace, carbon-lined induction crucible furnaces, reverberatory shaft furnaces rotary furnaces. Usually the melting temperature ranges from 1.200° C. to 1.700° C.

According to a preferred embodiment of the invention, the starting material has granulometry lower than 5 centimeters, but the particle size required in each process varies according to the furnace size, as occurs with the temperature. For a furnace of 20 t of load, for example, one may work with the same temperature mentioned above and with maximum size of the raw materials of up to 20 cm.

After the melting, a quenching is carried out, which may be made in air or in water, at room temperature. In a general way, the amount of water used in quenching is of about 80 liters of water/kg of molten liquid.

Finally, after the quenching the material obtained is ground so as to be applied as a fertilizer. When the quenching is carried out in water, it is followed by a step of drying the material prior to the grinding step.

The resulting molten glass is a phosphorus-potassium fertilizer containing also important amounts of silica, quicklime, magnesia and micronutrients, highly desired in all the fertilizing steps, for any grasses, vegetables, leguminous plants, fruit plants, etc, since it is almost a complete manure, a phosphorus-potassium fertilizer, in which only nitrogen lacks, which, on the other hand, is already found in the air and often in the soil itself through grasses that release it to the plant. The fertilizer of the invention has the additional advantage of not containing chlorides and further may contain a large amount of micronutrients incorporated naturally with the rocks used in the process.

Magnesia (MgO), quicklime (CaO) and silica ($SiO_2$) are preferably added during the process of obtaining the fertilizer of the present invention in order to provide good functioning of the melting process in the furnace with lower viscosity of the liquid formed and a more cost-saving employ of the electric energy, besides contributing to better subsequent solubility of phosphorus and potassium contained therein. The viscosity of the molten bath is a function of the eutectics of the components of the mixture and of the process temperature. For a given mixture, the higher the temperature of the molten material the lower its viscosity. When more formers of low-boiling eutectics are present in the mixture to be molten, more lower the melting temperatures will be. Once the mixture has been molten, the viscosity will be dependent on the temperature, that is, the higher the temperature the lower the viscosity. When more lower is the temperature of the process, the other parameters such as time, amount, isolation, etc are maintained, more lower the energy spent to melt the material will be. In fact, this is the way that potassium introduced in the mix works: potassium oxide, a flux by nature, combines with other oxides, forming low-boiling components and starting the formation of liquids at temperatures as low as those close to 700° C. And, more than this, the presence of magnesia and of quicklime contributes to better power of neutralizing the soil, while silica exhibit's a higher level of solubility when measured in incubation tests (indicates the amount of silica which a plant is able to absorb) and tests for solubility in weak acids.

The alkaline rocks from Poços de Caldas useful in the process of producing the fertilizer of the present invention have very low solubility in strong acids, such as hydrochloric acid, nitric acid and sulfuric acid, at both room temperature and higher temperatures. The extraction of these rocks, also with various traditional extractors such as citric acid, oxalic acid, acetic acid, ammonia chloride, mixture of sulfuric and hydrochloric acids, shows extremely low values, always lower than 0.12% of $K_2O$ extracted after 24 hours contact under stirring. For this reason, several attempts have been made to obtain a soluble form of potassium from the potassium rocks from the Planalto de Poços de Caldas. Some of these attempts were successful, but no continuity was given, perhaps because of the low cost-saving nature of the industrial process of transforming and/or because of the low output in the use thereof as a fertilizer.

The process of melting raw materials containing potassium and also raw materials containing phosphorus according to the present invention, which also has the participation of co-adjuvant elements like magnesia, quicklime, silica and micronutrients, and concomitantly with the quenching, provides a amorphous, vitreous final material with the results expected for a fertilizer containing potassium and phosphorus soluble in citric acid, insoluble in water, besides vitreous silica, magnesia, quicklime and micronutrients.

The main characteristics of the preferred raw materials used in manufacturing the phosphorus-potassium fertilizer of this patent application are presented hereinafter.

Alkaline Rocks

The alkaline massif of Poços de Caldas, located at the border of the states São Paulo and Minas Gerais, with its largest part on the side of Minas Gerais, has an area of 800 $km^2$. It is composed of rocks of very great petrography complexity, with ages ranging from 87 to 53 million years.

In the central southern and southwestern part of this massif, a hydrothermal alteration caused deep modifications in the chemical and mineralogical compositions of the alkaline rocks. The most important modification was the partial or total destruction of the feldspars, nepheline an agirine, followed by the formation of sericite and new feldspars, given rise to what is called today, in that region, "potassium rock". This rock exhibits $K_2O$ contents ranging from 8 to 15% and an average content of 11% of $K_2O$ in amounts higher than 3 million tons.

Example of Potassium Rock used in the present invention—Typical Chemical Analysis, %:

|  | Oxides, % | | | | | |
| --- | --- | --- | --- | --- | --- | --- |
|  | $SiO_2$ | $Al_2O_3$ | $Fe_2O_3$ | $K_2O$ | Na2O | $P_2O_5$ |
| Dry PF = 1.6 | 59.9 | 17.7 | 4.69 | 14.3 | 0.80 | 0.13 |
| Calcined | 60.9 | 18.0 | 4.76 | 14.5 | 0.80 | 0.13 |

Apatite:

Apatite is a mineral of the group of phosphates and may exist as hydroxylapatite (apatite hydroxide), fluorapatite (apatite containing fluorine) and chloroapatite (apatite containing chlorine), exhibiting, in its crystalline structure, respectively, hydroxyl, fluoride and chloride ions. Its general formula is $Ca_3(PO_4)_2(OH, F, Cl)$.

Example of apatite used in the present invention: Typical Chemical Analysis, %:

| Moisture + loss in fire | $P_2O_5$ | CaO | MgO | $SiO+RI^{(1)}$ | $Fe_2O_3$ |
| --- | --- | --- | --- | --- | --- |
| 5.75 (natural material) | 32.8 | 45.2 | 0.87 | 3.13 | 4.59 |
| Zero (calcined material) | 34.8 | 48.0 | 0.92 | 3.32 | 4.87 |

[1] RI = $SiO_2$ total + Not Soluble Residue. This test is standardized by the Brazilian Government. In the acid attack for solubilization of the sample, the insoluble residue is basically $SiO_2$ and a minor amount of other oxides that were not solubilized by the method, generally lower than 1%, and that are not considered together with silica.

Phosphorite:

Phosphorite is a sedimentary rock containing a high concentration of phosphate minerals, generally more impure than apatite and need previous concentration in order to enable its economical use. Being an impure material, it is generally associated to high concentrations of iron oxide.

Example of Phosphorite Concentrate, used in the present invention—Typical Chemical Analysis:

| Moisture + loss in fire | $P_2O_5$ | CaO | MgO | $SiO_2+RI^{(1)}$ | $Fe_2O_3$ |
| --- | --- | --- | --- | --- | --- |
| 18.1 (natural material) | 29.9 | 39.3 | 0.35 | 1.19 | 9.74 |
| Zero (calcined material) | 36.5 | 48.0 | 0.42 | 1.45 | 12.0 |

[1] RI = $SiO_2$ Total + Insoluble Residue. This test is standardized by the Brazilian Government. In the acidic attack for solubilization of the sample, the insoluble residue is basically $SiO_2$ and a minor amount of other oxides that were not solubilized by the method, generally lower than 1%, and that are not considered together with silica.

Other Raw Materials Used:

Raw materials rich in silicon oxides, like sands, ground quartz, silicates of different origins and qualities may be used for correcting the desired final $SiO_2$ content in the fertilizer.

Raw materials rich in magnesia such as calcined or sintered magnesite, calcined dolomite, others rich in magnesium silicates, such as serpentinite or dunite or olivines, may also be used for correcting MgO and $SiO_2$ contents in the desired fertilizer.

EXAMPLE

Seven batches of fertilizers with growing potassium values, except for test number 3, in which the potassium rock was not used in the formulation, that is, without the presence of potassium in order to compare with the other tests, which presented the following analysis after drying:

Chemical Analysis of Tests of Phosphorus-Potassium Fertilizers, %

| Test | T.P$_2$O$_5$ | C.P$_2$O$_5$ | T.K$_2$O | C.K$_2$O | T.SiO$_2$ | C.SiO$_2$ | CaO | MgO | NP |
|---|---|---|---|---|---|---|---|---|---|
| 1 | 21.6 | 20.5 | 0.47 | 0.46 | 19.3 | 19.1 | 30.6 | 13.3 | 60.5 |
| 2 | 19.2 | 18.6 | 0.96 | 1.16 | 23.6 | 23.1 | 27.0 | 13.3 | 64.7 |
| 3 | 23.4 | 18.4 | Molten without rock (no K) | | 16.9 | 15.8 | 31.3 | 13.0 | 59.0 |
| 4 | 18.8 | 16.7 | 2.10 | 2.15 | 26.4 | 26.3 | 26.6 | 12.9 | 62.0 |
| 5 | 16.9 | 16.2 | 3.70 | 3.68 | 26.5 | 25.4 | 24.3 | 10.9 | 61.8 |
| 6 | 17.2 | 16.8 | 4.30 | 4.24 | 24.2 | 23.6 | 25.3 | 11.9 | 60.9 |
| 7 | 14.0 | 13,. | 5.36 | 4.96 | 28.8 | 28.5 | 21.4 | 18,. | 58.5 |

Nomenclature:
T.P$_2$O$_5$ = Total phosphorus pentoxide
C.P$_2$O$_5$ = Phosphorus pentoxide soluble in citric acid
T.K$_2$O = Total potassium oxide
C.K$_2$O = Potassium oxide soluble in citric acid
C.SiO$_2$= Silicon dioxide soluble in citric acid
CaO and MgO = Total calcium oxide and Total magnesium oxide
NP = Neutralizing Power Through the analysis of the data provides in above table, it is possible to observe that the melting process with quenching almost guaranteed that all the phosphorus and potassium contained in the samples of the fertilizers were soluble in citric acid, a condition desired for an easy absorption by the plant and without the risks of easy solubilization in water and the consequent loss of the nutrients by bleaching.

Moreover, the results also show that almost all the content of SiO$_2$ was solubilized, a guarantee of replacement of the element by the plant and that desirable amounts of quicklime and magnesia are present, guaranteeing a neutralization power of about 60%, eliminating or reducing the need for liming before fertilizing.

It is also possible to observe the importance of the presence of K$_2$O in the components of the batching loads 1, 2, 4, 5, 6 and 7, responsible for the better solubility in citric acid of P$_2$O$_5$, SiO$_2$ and improvement of the neutralization power of the fertilizers obtained.

The invention claimed is:

1. A phosphorus-potassium fertilizer, comprising an amorphous, vitreous product obtained from raw materials containing:
   phosphorus pentoxide (P$_2$O$_5$);
   potassium oxide (K$_2$O);
   a provider of SiO$_2$ and silicates that is selected from the group consisting of quartz, sand, dunite, and serpentinite;
   a provider of MgO selected from the group consisting of magnesite, dunite, serpentinite, and dolomite; and
   dolomite as a provider of CaO,
   wherein the phosphorus-potassium fertilizer comprises at least 14.0% of total phosphorus pentoxide, based on the total weight of the fertilizer.

2. The phosphorus-potassium fertilizer according to claim 1, wherein the raw material containing phosphorus pentoxide is selected from the group consisting of apatite and phosphorite.

3. The phosphorus-potassium fertilizer according to claim 1, wherein the raw material containing potassium oxide is selected from the group consisting of potassium rock and phonolites.

4. The phosphorus-potassium fertilizer according to claim 1, further comprising micronutrients.

5. A process for preparing a phosphorus-potassium fertilizer as defined in claim 1, comprising a step of melting a mixture of said raw materials, followed by a quenching step.

6. A process of fertilizing soils, comprising a step of applying a fertilizer as defined in claim 1 to the soil of a crop.

* * * * *